United States Patent [19]
Razdan et al.

[11] Patent Number: 5,924,120
[45] Date of Patent: Jul. 13, 1999

[54] METHOD AND APPARATUS FOR MAXIMIZING UTILIZATION OF AN INTERNAL PROCESSOR BUS IN THE CONTEXT OF EXTERNAL TRANSACTIONS RUNNING AT SPEEDS FRACTIONALLY GREATER THAN INTERNAL TRANSACTION TIMES

[75] Inventors: Rahul Razdan, Princeton; David Arthur James Webb, Jr., Groton; James Keller, Waltham, all of Mass.; Derrick R. Meyer, Austin, Tex.

[73] Assignee: Digital Equipment Corporation, Houston, Tex.

[21] Appl. No.: 09/018,320

[22] Filed: Feb. 3, 1998

[51] Int. Cl.⁶ .............................. G06F 9/40; G06F 12/04
[52] U.S. Cl. .................... 711/141; 711/142; 711/143; 711/145; 395/800.41
[58] Field of Search ................. 395/800.32, 300.33, 395/800.23, 700.61, 200.59, 309, 182.03, 800.41; 711/143, 158, 121, 141, 144, 131, 118; 364/DIG. 1, DIG. 2

[56] References Cited

U.S. PATENT DOCUMENTS

| | | | |
|---|---|---|---|
| 4,301,347 | 11/1981 | Quine | 219/10.55 |
| 4,324,968 | 4/1982 | Smith | 219/10.55 |
| 4,336,434 | 6/1982 | Miller | 219/10.55 |
| 4,580,023 | 4/1986 | Simpson | 219/10.55 |
| 4,596,915 | 6/1986 | Simpson | 219/10.55 |
| 5,353,424 | 10/1994 | Partovi et al. | 104/DIG. 1 |
| 5,404,483 | 4/1995 | Stamm et al. | 314/DIG. 1 |

OTHER PUBLICATIONS

Gieseke, B.A., et al., "A 600MHz Superscalar RISC Microprocessor With Out-of-Order Execution".

Gieseke, B.A., et al., "A 600MHz Superscaler RISC Microprocessor With Out-of-Order Execution," *IEEE International Soild-State Circuits Conference*, (1997).

Gwennap, L., "Digital 21264 Sets New Standard—Clock Speed, Complexity, Performance Surpass Records, But Still a Year Away," *Microprocessor Report*, 10(14):1–11, (Oct. 1996).

Keller, J. et al., "A Superscaler Alpha Processor with Out-of-Order Execution," *Microprocessor Forum*, (Oct. 1996).

*Primary Examiner*—Daniel H. Pan
*Attorney, Agent, or Firm*—Hamilton, Brook, Smith, Reynolds, P.C.

[57] ABSTRACT

Use of an internal processor data bus is maximized in a system where external transactions may occur at a rate which is fractionally slower than the rate of the internal transactions. The technique inserts a selectable delay element in the signal path during an external operation such as a cache fill operation. The one cycle delay provides a time slot in which an internal operation, such as a load from an internal cache, may be performed. This technique therefore permits full use of the time slots on the internal data bus. It can, for example, allow load operations to begin at a much earlier time than would otherwise be possible in architectures where fill operations can consume multiple bus time slots.

14 Claims, 4 Drawing Sheets

LDL R1,100        ; dcache miss, start fill
                  ; of 64 bytes (4 cycles)

LDL R2,200        ; dcache hit, no waiting
    ⋮             ; inter leave load

ADDL R1,R2,R3     ; no waiting

FIG. 5

METHOD AND APPARATUS FOR MAXIMIZING UTILIZATION OF AN INTERNAL PROCESSOR BUS IN THE CONTEXT OF EXTERNAL TRANSACTIONS RUNNING AT SPEEDS FRACTIONALLY GREATER THAN INTERNAL TRANSACTION TIMES

FIELD OF THE INVENTION

The present invention relates generally to data processing systems and in particular to maximizing utilization of an internal processor bus in the context of executing external transactions which may occur at speeds which are fractionally slower than a cycle time of the internal processor bus.

BACKGROUND OF THE INVENTION

The integrated circuit microprocessors presently in use are capable of achieving speeds which are about one hundred times faster than the first generation microprocessors which originally became available about twenty-five years ago. Although this increase in speed can be attributed to some extent to fundamental advances in integrated circuit processes, physical limitation will always place certain restrictions on the maximum attainable processing speed. Therefore, it is now common for microprocessors to include such features as local cache memories, instruction pipelines, instruction reordering and other architectural techniques which can be used to achieve even faster speeds.

One primary limitation on the speed of microprocessor operation is cycle time. In general, minimum cycle times are encouraged by keeping the definition of individual instructions fairly simple, and by keeping the interactions between such instructions also very simple. However, perhaps the most critical aspect of minimizing cycle time is the need to optimize the implementation of data busses that are used to transfer information to and from the central instruction execution unit(s).

For example, a load instruction causes the processor to first look to the contents of a local cache memory (e.g. local in the sense that it is located on the same integrated circuit as the instruction execution unit) to attempt to deliver data to an internal register. If a miss occurs such that the data is not available in the local cache, the processor must then attempt to obtain the data by performing an off chip transaction referred to as a cache fill operation. The fill operation updates the contents of the internal cache to match those of an external main memory or backup cache.

One goal of high speed Reduced Instruction Set Computing (RISC) architectures is typically to keep a subset of external memory available in the internal memory Therefore, a typical cache miss operation may result in multiple data words being provided from the external memory to the cache such as over a data bus. As a result, a simple load operation may in fact occupy a data bus for an extended number of cycles, depending upon whether or not its hits in the cache.

In order to maximize the overall execution speed of the processor, it is therefore necessary to optimize the use of the bus such that there are no unused cycles, even during cache fill operations.

Another challenge exists in that the bus must therefore efficiently support both internal and external transactions.

For example, if the internal cache access time is approximately equal to the off chip memory access time, then no unused cycles or "dead time" will exist on the data bus during a fill operation. A somewhat optimized situation also exists if the two access times are integral multiples of one another. For example, if the internal cache can run at two times the speed of the external cache, an external transaction can be completed on every other cycle.

In some instances, however, the optimized speed of internal and external transactions may not be the same as or even integral multiples of one another. Unfortunately, without careful planning of the use of the common data bus, the use of caches may actually result in many unused dead cycles on the bus, which in turn adversely impacts the ability to achieve optimum performance on the bus. For example, if the transactions with the external cache may occur at one and one half the times slower (1.5×) than the internal transactions, the data bus may end up being idle approximately one third of the time. This is because there is a need to wait an additional bus cycle for every two external transactions.

SUMMARY OF THE INVENTION

It thus has been thought that the processor must necessarily wait for the internal cache transaction to complete prior to issuing any other instruction which requires activity on the shared data bus such as in a microprocessor integrated circuit in the context of running external transactions at a rate which is a non-integral multiple of the rate of internal transactions.

The present invention avoids this difficulty, for example, when external transactions occur at a rate which is one and a half times the rate of the internal transactions, by inserting a delay of one cycle in the signal path during an external operation such as a fill. The one cycle delay provides a time slot in which an internal single cycle operation, such as a load from an internal cache, may be performed.

More particularly, the invention operates in the context of executing an instruction in a data processor, where the processor is connected to an internal load-store data bus to access data stored in a local cache memory. The load-store data bus is used for completing internal local cache transaction by which the data for the instruction is obtained by the processor as well as for completing external fill transactions by which data is provided to the local cache from an external data source. In the event of a local cache miss during the execution of a given data access instruction, an external fill transaction can be initiated on the load-store data bus to obtain one or more data elements from an external data source. By delaying the storage of data from external fill transactions, a time slot is created on the load-store data bus for interleaving other internal local cache transactions, during the pendency of a given external fill transaction.

The technique does not affect the timing of the data path to instruction execution units, and therefore, data from the external fill transaction may be provided directly to the execution unit as before.

The invention therefore permits full use of the time slots available on the internal data bus.

In addition, it allows load operations to begin at a much earlier time than would otherwise be possible in architectures where fill operations can consume multiple bus cycles.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIG. 5 is an instruction sequence illustrating how the invention may be used to speed up the processing of certain instruction sequences.

DETAILED DESCRIPTION OF THE INVENTION

Figure 1:
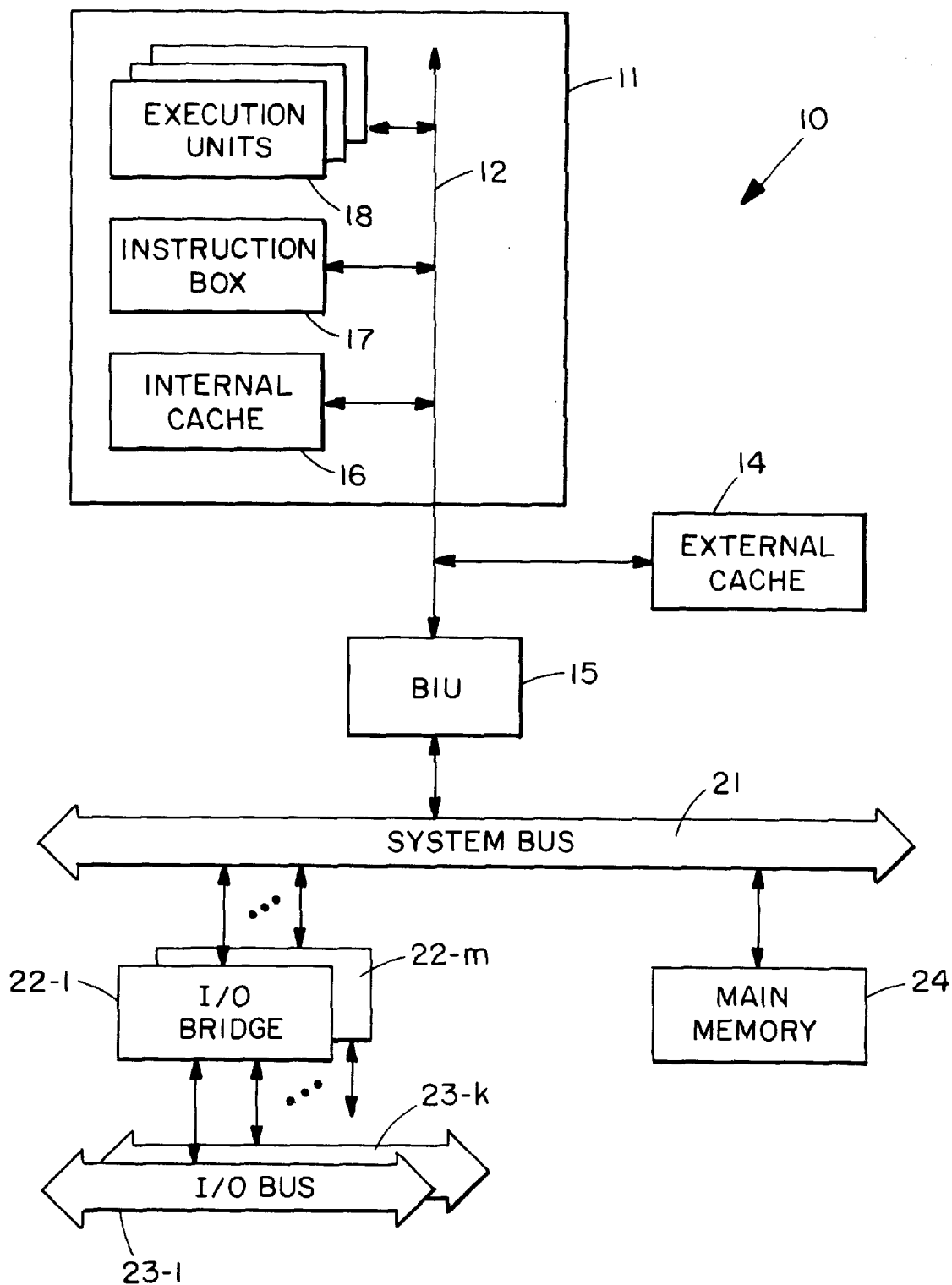
FIG. 1 is a block diagram of a data processing system that makes use of the invention.

FIG. 1 is a block diagram of a data processing system 10 which makes use of an internal bus timing scheme according to invention. The data processing system 10 includes a central processing unit (CPU) 11, an external cache memory (Bcache) 14, a bus interface unit (BIU) 15, a system bus 21, one or more input/output (I/O) bridges 22-1, . . . , 22-M, input/output (I/O) buses 23-1, . . . , 23-K and main memory 24. The data processing system 10 may, for example, be in general configured from Alpha series microprocessor components available from Digital Equipment Corporation of Maynard, Mass.

In general, commands are executed by the central processing unit 11 using data contained in the external cache 14 and main memory 24. The components of the data processing system 10 communicate with one another primarily via the system bus 21. For example, the central processing unit 11 may communicate with input/output devices such as disk drives or display units over the I/O buses 23 and I/O bridges 22. The bus interface unit 15 is responsible for arbitrating use of the system bus among the central processing unit 11, I/O bridges 22, and main memory 24.

The present invention relates to a manner of handling data transfer transactions internal to the central processing unit 11. These transactions involve the transfer of data along a processor bus 12. The processor bus 12 interconnects an internal cache (Dcache) 16, an instruction box 17, and one or more execution units 18 to one another and to components external to the central processing unit chip 11 such as the external cache 14 and bus interface unit 15.

Generally speaking, in a manner which is already known in the art, the central processing unit 11 fetches program instructions and data from main memory 24 and/or other external sources such a disk connected to the I/O bus 23. The central processing unit 11 then executes such instructions, and in the process thereof, uses the processor bus 12 to not only perform external transactions with the external cache 14 and bus interface unit 15, but also internal transactions with the internal cache 16, instruction box 17, and execution units 18.

In order to obtain optimized performance the central processing unit 11 attempts to maintain as many of the instructions and data necessary for carrying out its tasks within the internal 16 and/or external cache 14. In addition, during operation of a particular instruction, the instruction box 17 is responsible for fetching and pre-processing instructions for execution by one or more of the execution units 18 in sequence in order to provide high throughput of instructions.

The internal cache 16 is also understood to include not only memory circuits but also control logic circuits to coordinate access to data among the external cache 14 and main memory 24 through the bus interface unit 15.

The instruction box 17 and executions units 18 may each make use of pipelining techniques in order to achieve higher throughput. For example, the instruction box 17 typically includes logic circuits to prefetch instructions from an instruction cache (not shown), to predict a next instruction that will be executed after a branch instruction, and to re-order the execution of instructions in order to optimize the use of the various components of the system 10.

Figure 2:
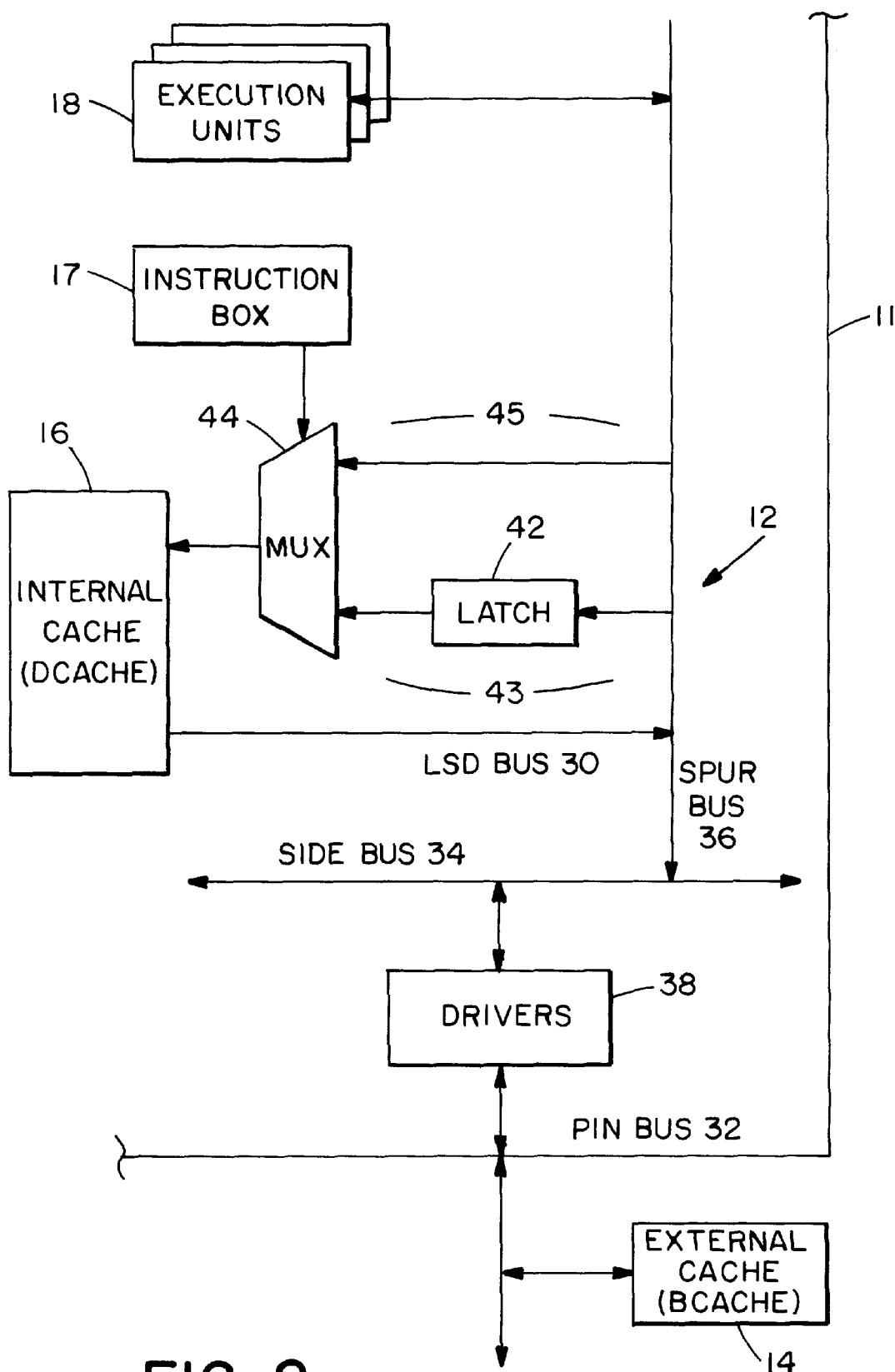
FIG. 2 is a more detailed block diagram of a microprocessor data bus used in illustrating how load and fill operations are performed according to the invention.

The present invention relates to optimizing use of the processor bus 12 internal to the central processing unit chip 11. The organization of this bus internal to the central processing unit 11 is more particularly detailed in FIG. 2.

Of interest to the present invention is the implementation of the portion of the processor bus 12 which is used for data transfer operations between the internal cache 16 and execution units 18. This bus is referred to herein as the load store data bus 30. While the processor bus 12 is a single bus from a logical standpoint, it is typically implemented as a number of electrically individual buses, including a pin bus 32, a side bus 34, and spur bus 36. The pin bus portion 32 is the portion which is connected to the external pins of the chip 11. The pin bus 32 signals are typically connected to a side bus 34 through driver circuits 38 that are responsible for electrically interfacing with driving signals on or off to the chip 11. The side bus 34 is so named as it typically is a set of wires that run along the side of the chip 11. The spur bus 36 runs into the internal sections of the chip from the side bus 34 providing signals to the internal components such as the internal cache 16 and execution units 18.

In order to optimize the use of load store data bus 30, access thereto must be carefully planned for each type of instruction executed by the central processing unit 11. Consider, for example the typical use of the bus 30 during a load instruction (LDx) when the requested data is already available in the internal data cache (Dcache) 16, e.g., a cache hit. During an appropriate portion of the instruction cycle, the instruction box 17 issues a command to the Dcache 16 to assert the contents of the addressed location onto the load store data bus 30. As with other processors 11, the instruction box pipeline 17 processes the LDx instruction over multiple instruction pipeline cycles as shown in Table 1.

TABLE 1

Instruction Pipeline Timing for
LDx - Cache Hit
(Internal Transaction)

| Pipeline Cycle | Operation |
| --- | --- |
| 3: | Issue load instruction |
| 4: | Register file look up of requested address |
| 5: | Virtual address calculation |
| 6: | Dcache data lookup |
| 7: | Data available on load store data bus |

Figure 3:
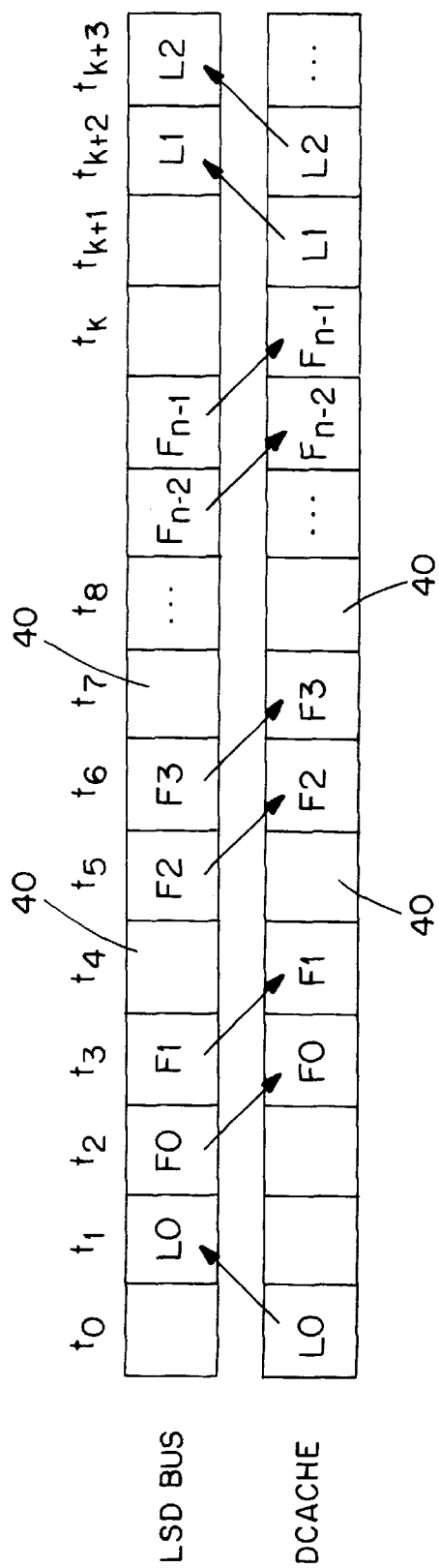
FIG. 3 is a prior art timing diagram for load and fill operations on the data bus.
Figure 4:
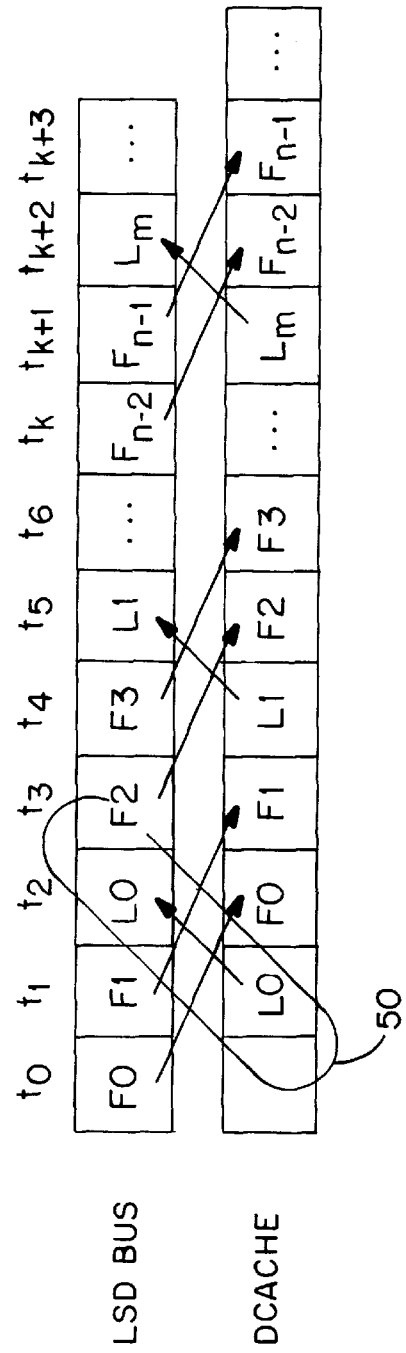
FIG. 4 is a timing diagram for load and fill operations according to the invention.

FIG. 3 is an exemplary timing diagram depicting more particularly how this LDx instructor uses the load store data bus 30. The upper row of the figure shows the availability of data on the bus 30, and the lower row shows the availability of data at the input/output ports of the Dcache 16. As shown, during a first bus slot time, t0, (corresponding to LDx instruction cycle 6), the requested data is available at the output of the Dcache 16. (The dedication of load instruction to this function at the Dcache is depicted in FIG. 3 by the letter "L0" in the box associated with the "Dcache" portion diagram at slot time t0.) On the next bus slot, t1, the data output from the Dcache 16 is then asserted onto the bus 30, and therefore is available to be latched by the intended destination, such as one of the execution units 18.

However, in the event of a cache miss situation, such as when the requested data is not available within the on chip Dcache 16, a different sequence of events must occur on the bus 30. Because of the nature of programming it is well known to be most efficient technique to obtain not only a single actually requested byte or word data for a particular pending LDx instruction, but to also obtain multiple adjacent data words at the same time.

Therefore, a given LDx which misses in the local Dcache 16 results in a fill operation. The fill operation obtains the requested data and contents of adjacent locations from the external cache 14 in order to update the contents of the internal cache 16. A given load instruction for example, may result in issuing a fill which rqeuires the fetching of four adjacent data words from the external cache 16. In addition, the fill fetch operation must provide the requested specific data to the execution unit(s) 18 for the pending operation at the expected time.

An LDx instruction for a Dcache miss is typically processed by the instruction pipeline 17 per Table 2.

TABLE 2

Instruction Pipeline Timing for
LDx - Cache Miss
(External Transaction)

| Pipeline Cycle | Operation |
|---|---|
| 3: | Issue load which consumes fill |
| 4: | NOP |
| 5: | NOP |
| 6: | NOP |
| 7: | data on load store bus |
| 8: | write fill to cache |
| 9: | write fill to cache, etc. as needed |

As shown in FIG. 3, the fill data F0 being brought onto the load store bus 30 from an external source (e.g., the external cache 18), is available at bus slot time t2, corresponding to instruction cycle 7. It is then written to the internal cache 16 on the next bus slot t3. Subsequent fill data F1 may then follow in the subsequent bus slot t3.

FIG. 3 shows that the internal load operation L0 and external fill operation F0 actually manipulate the load store data bus bus 30 and the Dcache 16 in the opposite order. That is, the internal load requires access to the cache 16 first, and then the bus 30, whereas the fill requires access to the bus 30 first and then the cache 16. This is not typically an issue in certain systems where the external transaction rate is typically about the same as than the rate at which internal transactions can be completed.

However, in a situation such as in the invention, internal transactions such as the load L0 from local cache 16 are actually faster than the rate at which transactions such as the external memory fill can be completed. The order in which the load and fill require access to the bus therefore does indeed adversely impact the use of the bus 30.

Continue to pay attention to FIG. 3, in the event that the external cache 14 provides fill data at a rate which is one and half times slower than (1.5×) the rate at which the internal cache 16 may store such data, a situation exists where there are "dead" slots 40 on the bus 30. In particular, during the three bus slot times t3 through t5, only two external data words are available to be stored in the Dcache 16. A "dead" slot 40 thus appears on the bus 30 at slot time t4 in which it is not possible to provide a data word to the Dcache 16. The external cache 14 does not provide the third and forth words of the fill until times t5 and t6, and the fill therefore is not completely finished until slot time t7. The load store data bus 30 thus is not again available for another operation until time t8. Even a simple subsequent load operation, such as L1, must therefore wait until time slot t9 to access the bus 30.

In accordance with the invention, more optimized use of the load store data bus 30 is obtained by timing accessed differently for internal transactions, e.g., cache load operations, than for external transactions, e.g., cache fill type operations. Specifically, in order to interleave as many accesses to the bus 30 in the dead slots 40 as possible, a selectively enabled delay element, such as a data latch 42 and selector 44, are disposed between the load store data bus 30 and the input data path to the internal cache 16. The delay element 42 provides a delayed path 43 from the bus 30 to the cache 16. An un-delayed direct path 45 is also provided to the Dcache 16 input through an alternate path through the selector 44. The output data path from the internal cache 16 may be directly connected to the load store data bus 30. Logic signals provided by the instruction box 17 in turn cause the selector 44 to select either the direct path 45 or the delayed path 43 depending upon the type of transaction in progress.

More particularly, if a cache miss occurs such that a fill transaction must be executed, the fill operation may begin to be consumed as before, and place the fill data words F0 and F1 on the bus at times t0 and t1. However, by enabling the delay path 43, data will not actually be stored into the Dcache 16 until two time slots later, at times t2 and t3 respectively. A window or "bubble" 50 therfore appears in which other internal operations may proceed on the load store data bus which require access to the Dcache 16 then the bus 30. For example, a simple load L0 from the Dcache 16 may now take place in the bubble slot 50.

The load store data bus 30 again becomes available for consuming the remaining four words of the fill operation at times t3 and t4, completing respectively at times t5 and t6.

By enabling the delay path 43 for fill operations, thereby adding the one time slot delay between the Dcache 16 and the load store data bus 30, the load store bus 30 is now busy in all time slots.

Enabling the delay path 43 solely to the input to the Dcache 16 also does not adversely affect the load to use latency within the execution units 18. This is because the requested load data still arrives at the load store data bus 30 at the same time. Therefore, from the perspective of the execution unit 18, the data needed arrives at the same time as in prior designs. However, with the added delay path 43, any pending ordinary loads may issue in the bubble slots 50 appearing on the load store data bus 30.

Therefore it does not matter that the fill data may be delayed before being stored in the internal cache 16. In other words, in the situation where the external transactions operate at a fractionally greater speed than the internal transactions, there is no impact on overall instruction execution speed.

Indeed, in some instances, the insertion of the selectable delay path 43 may actually increase the speed of execution. FIG. 5 is an illustrative set of instructions that show how the invention can be used in this manner. In accordance with the first instruction in the sequence, a load word to register

LDL R1, 100 the central processing unit 11 is being requested to fetch the contents of location 100 from memory and to store the contents in an internal register, R1. However as the comments indicate, when this instruction is encountered, the situation in the Dcache 16 is such that the instruction results in a cache miss. The instruction box 17 must therefore begin a fill operation, such as of four words, or sixty-four bytes, beginning at location 100.

Immediately following thereafter is an instruction

LDL R2, 200 which is a request to load the contents of location 200 in register R2. In this situation, the contents of location 200 are already in the Dcache 16 and so therefore this instruction does not require a fill operation prior to executing. In accordance with the invention, the internal load operation for completing this instruction may therfore execute in the bubble slot 50 created for the prior operation fill, such as in the bus time slot between the pending fill operations F1 and F2. At the time that the third instruction

ADDL R1, R2, R3 which adds the contents of R1 and R2 and stores the results in R3, there are no wait states needed as the requested data from the first LDL R1 instruction and second LDL R2 instruction are already available.

However in the prior art there would be a delay of up to eight instruction cycles for the fill operation and initiated by the first instruction to complete, since the second load could not complete as early.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of executing an instruction in a data processor, the processor connected to a load-store data bus to access data stored in a local cache memory, the load-store data bus being used for completing internal local cache transactions by which the data for the instruction is obtained by the processor, as well as for completing external fill transactions by which data is provided to the local cache from an external data source, and wherein the data processor further includes an execution unit connected to the load-store data bus, the method comprising:

(a) in the event of a local cache miss during the execution of a given data access instruction, initiating an external fill transaction on the load-store data bus to obtain one or more data elements from an external data source, the external fill transactions occurring at a rate which is slower than the rate of the internal transactions carried out on the load-store data bus between the processor and the local cache;

(b) delaying the storage of data from external fill transactions such that a time slot is created on the load-store data bus for interleaving other internal local cache transactions during the pendency of a given external fill transaction; and (c) providing data from the external fill transactions directly to the execution unit.

2. A method as in claim 1 wherein the rate of external fill transactions is one and one-half times slower than the rate of internal local cache operations.

3. A method as in claim 2 wherein the external fill transactions are delayed by one load-store bus cycle.

4. A method as in claim 1 wherein the instruction is a load instruction.

5. A method as in claim 1 wherein the instruction is a store instruction.

6. A method as in claim 1 wherein the external fill transaction transfers data from an external cache memory to the internal cache memory.

7. A method for ordering accesses on an internal load-store data bus within a data processor, the internal load-store data bus for connecting a local cache memory, an execution unit, and for coupling data to and from an external processor data bus thereto, transactions on the external processor data bus occurring at a rate which is at least one and one-half times slower than a rate of transactions on the internal load-store data bus, the method comprising the steps of:

(a) in response to execution of an instruction by the processor which results in a data reference which misses in the local cache, performing an external fill transaction to obtain data to be written into the local cache, the external fill transaction, in two consecutive cycles causing data to be asserted on the load-store bus from the external processor data bus, and in a next successive cycle, causing the external processor data bus to remain idle, thereby leaving an idle cycle on the load-store bus;

(b) delaying the writing of data asserted on the load-store data bus into the local cache memory by at least one cycle during an external fill transaction; and (c) in response to execution of a load instruction by the processor which results in a data reference which hits in the local cache, reading data from the local cache and asserting such data read thereby onto the load-store bus during the idle cycle.

8. A data processor in which a load-store data bus is connected to permit access to data stored in a local cache memory, the load-store data bus connected to complete internal local cache transactions by which the data for an instruction is obtained by the processor as well as to complete external fill transactions by which data is provided to the local cache from an external data source, the data processor comprising:

(a) an instruction box, coupled to initiate data transfers on the load-store data bus, which, in the event of a local cache miss during the execution of a given data access instruction, initiates an external fill transaction on the load-store data bus to obtain one or more data elements from an external data source, the external fill transactions occurring at a rate which is greater that the rate of the internal transactions carried out on the load-store data bus with the processor and the local cache; and (b) a delay unit, connected between the load-store data bus and the local cache, for delaying the storage of data from external fill transactions such that a time slot is created on the load-store data bus for interleaving other internal local cache transactions during the pendency of a given external fill transaction.

9. A processor as in claim 8 further comprising:
(c) an execution unit connected to the load-store data bus to receive data directly during an external fill transaction.

10. A processor as in claim 8 wherein the rate of external fill transactions is one and one-half times slower than the rate of internal local cache operations.

11. A processor as in claim 8 wherein the delay unit delays the external fill transactions by one load-store bus cycle.

12. A processor as in claim 8 wherein the instruction is a load instruction.

13. A processor as in claim 8 wherein the instruction is a store instruction.

14. A processor as in claim 8 wherein the external fill transaction transfers data from an external cache memory to the internal cache memory.

* * * * *

UNITED STATES PATENT AND TRADEMARK OFFICE
CERTIFICATE OF CORRECTION

PATENT NO. : 5,924,120
DATED : July 13, 1999
INVENTOR(S) : Rahul Razdan, David Arthur James Webb, Jr., James B. Keller, and Derrick R. Meyer It is certified that error appears in the above-identified patent and that said Letters Patent is hereby corrected as shown below:

Column 8, line 59, delete "that" and insert --than--.

Signed and Sealed this

Thirtieth Day of November, 1999

Attest:

Q. TODD DICKINSON

Attesting Officer

Acting Commissioner of Patents and Trademarks